E. MOUNTFORD.
ARTIFICIAL TOOTH AND METHOD OF MAKING SAME.
APPLICATION FILED MAY 18, 1916.
1,224,195. Patented May 1, 1917.
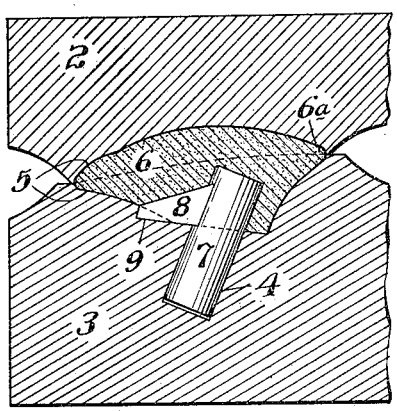
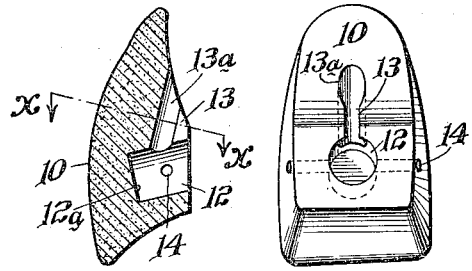
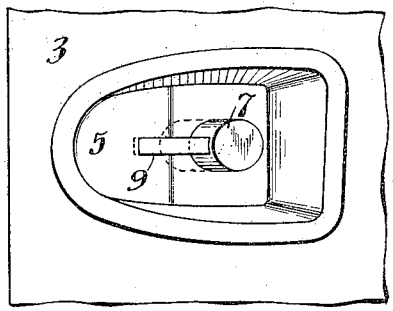
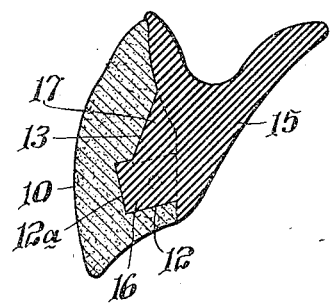
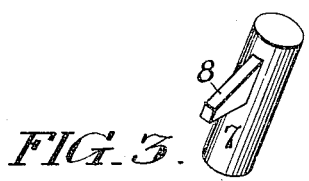
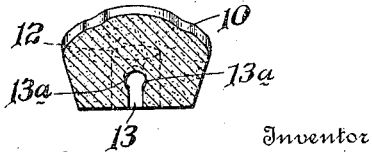
Inventor
Edwin Mountford
By
Attorney
Witnesses
Daniel Webster Jr.
E. W. Smith

UNITED STATES PATENT OFFICE.

EDWIN MOUNTFORD, OF YORK, PENNSYLVANIA, ASSIGNOR TO THE DENTISTS' SUPPLY COMPANY, A CORPORATION OF NEW YORK.

ARTIFICIAL TOOTH AND METHOD OF MAKING SAME.

1,224,195.  Specification of Letters Patent.  Patented May 1, 1917.

Application filed May 18, 1916. Serial No. 98,287.

*To all whom it may concern:*

Be it known that I, EDWIN MOUNTFORD, a citizen of the United States, and resident of York, county of York, and State of Pennsylvania, have invented an Improvement in Artificial Teeth and Methods of Making Same, of which the following is a specification.

The object of my invention is to provide a construction of improved artificial teeth and method of making the same, the particular feature of the invention being directed to the manner of providing the recessed portions in the back of the teeth into which the rubber of the plate may be received and form a strong union between the plate and teeth.

In respect to the tooth structure, my object is to provide the back with a diagonal recess having an upwardly directed secondary recess of less width and preferably undercut so as to provide locking shoulders back of which the rubber of the plate may extend to lock the tooth to the plate and at the same time provide a vulcanite mass extending from the plate into the recessed portions of the tooth in such manner as to permit a powerful thrust to be given in a downward direction without danger of the tooth breaking away from the plate.

In respect to the mold for forming the tooth in connection with the process of its manufacture, the two parts of the mold provide a tooth space into which a preferably detachable upwardly extending stud is arranged and supported by that portion of the mold forming the back of the tooth, said stud arranged obliquely to the floor of the tooth space and the mold further has a lateral web extending upward above the floor and into the tooth space, so that when the bisque material is molded, it will inclose those portions of the stud and web which project into the tooth space, and in this manner ultimately provide in the back of the tooth an oblique hole or aperture having a slotted secondary aperture, extending upwardly on the back of the tooth. In practice, it is preferable that the stud shall be detachable from the mold part so that when the bisque has been molded and then dried out by a moderate temperature, the mold may be opened and the lower part inverted to shake out the tooth with its attached stud, after which the said stud is removed leaving the suitable recesses in the back of the tooth. The tooth so formed may then be burned to vitrify the bisque and then employed in connection with the rubber plate; but preferably, further treatment is given to the bisque before being burned or vitrified to insure a firmer hold upon the rubber plate, said additional treatment being to provide transverse holes and an undercut portion in the recess. More particularly referring to these additional operations, the recess formed by the web is grooved at its innermost part to provide undercut sides and thereby furnish shoulders back of which the rubber may extend, and in addition thereto the bisque may be drilled with holes transversely, said holes opening into the oblique recess, and into which holes the rubber may be forced from the recess to provide a strong interlock with the tooth, all of which will be better understood by the detailed description hereinafter.

Referring to the drawings:—Figure 1 is a cross section of a portion of a mold embodying my improvements; Fig. 2 is a plan view of a part of the lower mold portion showing the web and the detachable stud; Fig. 3 is a perspective view of a form of a stud and web which are jointly detachable from the lower mold portion; Fig. 4 is a sectional side view through my improved tooth; Fig. 5 is a rear elevation of my improved tooth; Fig. 6 is a transverse section of the same on line *x—x* of Fig. 4; and Fig. 7 is a sectional view showing the tooth attached to the rubber plate.

2 and 3 are the two parts of the mold, the said parts being recessed as at 5 to provide the tooth space 6. 7 is an oblique stud which is received in a diagonal hole 4 in the floor or bed of the recessed portion of the lower part 3 of the mold, this hole 4 being of a depth sufficient to hold the stud in such manner that it shall project obliquely into the tooth space 6 and in a direction toward the portion 6ᵃ which would mold the incisor edge of the tooth. The mold part 3 is further provided with a more or less triangular shaped wing or web 8 extending upward into the tooth space and acting with the stud to mold a hole with a lateral recess in the bisque tooth. These parts may be rigid with the mold or removable in part or in whole as desired. This stud 7 may be provided at one side with a web 8 narrower than the diameter of the stud, as will be clearly understood by reference to Fig. 2, and preferably this web is more or less triangular in shape and its lower edge fitting snugly a suitable recess 9 in the bed of the tooth space. Not only is the stud 7 arranged obliquely toward the incisor edge of the tooth, but the inclination of the web 8 is also oblique for purposes which will be hereinafter more fully set forth.

With the mold assembled as indicated in Figs. 1 and 2, the bisque material in the tooth space 6 will be molded about the stud 7 and web 8, and when baked it may be shaken from the mold with the stud portion attached, the weight of the metal assisting in shaking the bisque tooth out of the lower portion 3 of the mold when inverted. When the stud 7 is withdrawn from the bisque tooth, there will be left in the back thereof a diagonally directed hole 12 and an upwardly direction recess or slot 13, said cylindrical recess and slotted recess corresponding to the shape of the parts 7 and 8 of the mold. If the web is made to be removable with the stud then they would both be removable from the bisque tooth after taken from the mold. It will be understood, however, that the pin and the web need not be removable from the mold, if such construction is preferred, and I do not restrict myself in this respect..

After the tooth has been molded as above described, it is then preferably drilled with holes 14 through its sides, said holes opening into the cylindrical recess 12 and providing lateral recesses or undercut portions to said holes; and furthermore, it is desirable that the innermost portion of the slotted recess 13 shall have its side walls laterally grooved as at 13$^a$ to provide undercut sides or shouldered portions with which the rubber of the plate will interlock. This grooving is easily done while the bisque is in its baked or dried condition and before being vitrified by burning. When the tooth has been finished in the manner above described, it is then vitrified by high temperature in an operation termed "burning," and in which the bisque becomes porcelain. When the teeth are thus formed, they may be secured to a suitable rubber plate 15, as indicated in Fig. 7. These plates are molded in plaster molds made from impressions taken from the mouth, as is well known in dental practice, and before the rubber is vulcanized it is made to extend down into the recesses 12 and 13 and also into the lateral holes or apertures 14. Moreover, when the recess 13 is grooved, as at 13$^a$, the rubber is caused to spread in said grooves and interlock with the shoulders formed by the sides of the recess adjacent to said grooves, all of which will be readily understood by those skilled in the art. By reference to Fig. 7, it will be noted that the general direction of the extensions 16 and 17 of the rubber of the plate is obliquely downward toward the incisor edge of the tooth so that in mastication the thrust is well directed through the tooth in a downwardly direction to enable the work to be performed by the tooth to be well done without the least danger of its breaking away from the plate. It will be noted that the lower part 16 of the rubber fits the bottom portion 12$^a$ of the hole or recess 12 in the tooth in such manner as to positively position the tooth, properly direct the thrust and also anchor the tooth firmly to the plate. It will further be seen that the thrust from that portion of the plate where the gums apply the pressure downward to this portion 12$^a$ in the tooth would be directed through the continuous body of rubber 17 which fills the slotted recess 13 and the undercut portions 13$^a$ thereof, all of which not only firmly holds the tooth to the plate but gives a strong mass of rubber properly shaped and positioned to perform a maximum work without danger of rupture.

I have, by way of illustration, shown certain specific forms to the recesses and of the shape of the tooth, but it will be manifest that all of these may be somewhat varied to suit the special requirements or the wishes of the designer. It will be readily understood that the grooved portions 13$^a$ may be omitted, though in the preferred construction they are highly desirable and would always be employed where cost of manufacture was not a material matter to be considered.

From the foregoing description, it will be seen that I have provided a very simple and desirable manner of forming the tooth to insure its being strongly secured to the extension of the plate, whereby it has not only the edges of the former dove-tailed construction of the groove, but also special features of advantage which are more particularly brought into the structure by directing the hole or recess downward toward the cutting or incisor edge of the tooth. A powerful union is provided for insuring the downward thrust of the tooth, whereas the slight downward pull of the tooth (to disengage it from the plate) is rendered ineffectual by the anchoring due to the plate material extending into the small transverse holes passing through the tooth mesio-distally.

While I have described my invention both as to the mold, the process of manufacture, and the tooth structure in its finished form, in the most preferred forms and which I have found most desirable in practice, nevertheless I do not restrict myself to the minor details of structure or method, as these may be reasonably varied within the spirit of the invention. While I have described the construction of the mold to enable a clear understanding of the method employed in producing the product, no claim is made in this application for the mold or apparatus, as the same forms subject matter of application Serial Number 129,955, filed November 7, 1916.

Having now described my invention, what I claim as new and desire to secure by Letters Patent, is:—

1. An artificial tooth consisting of a porcelain body having its back provided with an inwardly extending recess the same having its axis oblique to the length of the tooth and in a direction toward the incisor edge thereof and said tooth also having a slotted recess opening into the oblique recess and terminating in the face of the tooth surface and in which further, the inner portions of the side walls of the slotted recess are grooved to form undercut portions.

2. An artificial tooth consisting of a porcelain body having its back provided with an inwardly extending recess the same having its axis oblique to the length of the tooth and in a direction toward the incisor edge thereof and said tooth also having a slotted recess opening into the oblique recess and terminating in the face of the tooth surface and said tooth also having lateral recesses formed in its side walls and opening into the oblique recess.

3. An artificial tooth having its back provided with a large recess extending from the back surface into the body of the tooth, and an upright slotted recess of less width extending from said large recess away from the incisor edge of the tooth and of gradually less depth and terminating at a distance from the root end of the tooth.

4. An artificial tooth having its back provided with a large recess extending from the back surface into the body of the tooth, and an upright slotted recess of less width extending from said large recess away from the incisor edge of the tooth and of gradually less depth and terminating at a distance from the root end of the tooth, said slotted recess enlarged at its inner portion to provide undercut side walls.

5. The herein described method of forming a porcelain tooth, which consists in first molding the bisque about an oblique stud and a web extending into the tooth space of the mold, drying the molded bisque and removing it from the mold parts to provide a tooth form having an oblique recess and a slotted recess opening therein, then grooving the inner portion of the slotted recess to provide undercut side walls to the slotted grooved portion, and finally burning the tooth to transform it into a vitreous form.

6. The herein described method of forming a porcelain tooth, which consists in first molding the bisque about an oblique stud and a web laterally arranged thereto, drying the molded bisque and removing the mold parts to provide a tooth form having an oblique recess and a slotted recess opening therein, then grooving the inner portion of the slotted recess to provide undercut side walls to the slotted grooved portion and also drilling transverse holes through the tooth body mesio-distally, and finally burning the tooth to transform it into a vitreous form.

In testimony of which invention, I hereunto set my hand.

EDWIN MOUNTFORD.

Witnesses:
 G. H. WHITELEY, Jr.,
 CHARLES L. RODGERS.

Copies of this patent may be obtained for five cents each, by addressing the "Commissioner of Patents, Washington, D. C."